(No Model.)
P. WHITE.
AUTOMATIC SUPPLY VALVE FOR TANKS.
No. 491,694. Patented Feb. 14, 1893.
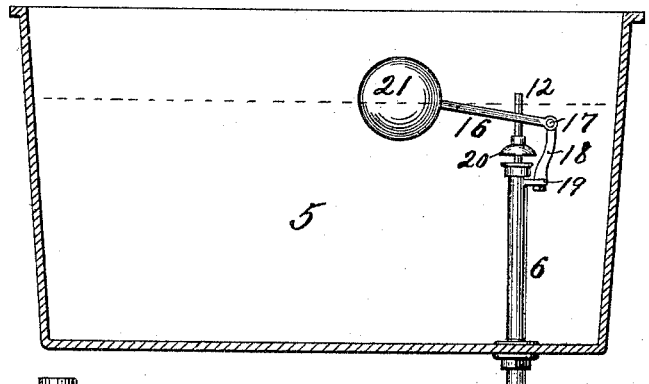
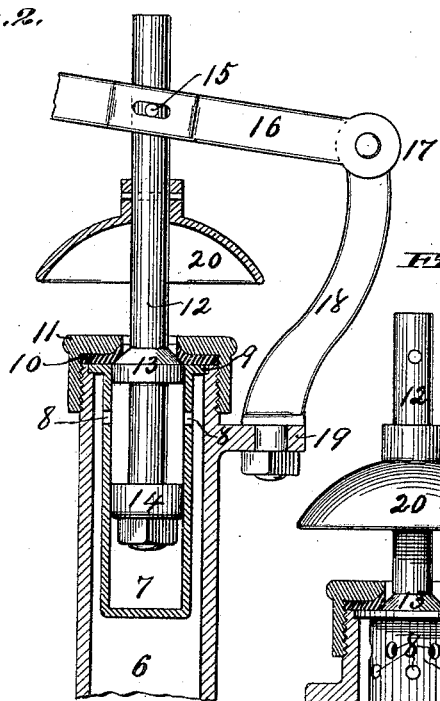
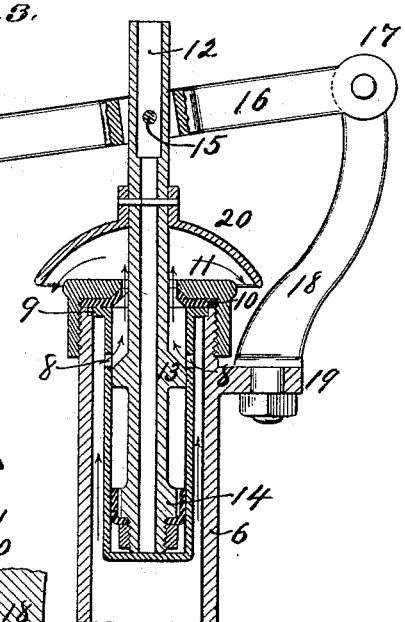
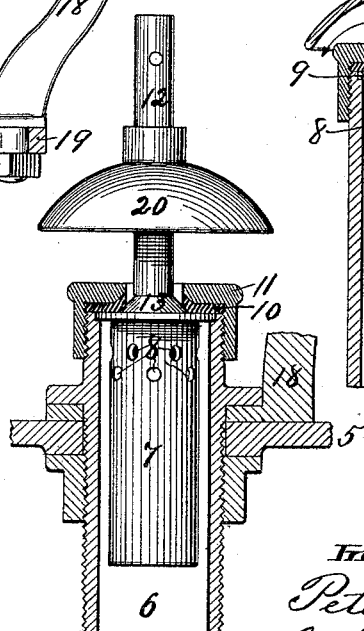
Witnesses:
M. M. Brown
S. N. Hoggson
Inventor:
Peter White,
By Fowler & Fowler
Attorneys.

UNITED STATES PATENT OFFICE.

PETER WHITE, OF ST. LOUIS, MISSOURI.

AUTOMATIC SUPPLY-VALVE FOR TANKS.

SPECIFICATION forming part of Letters Patent No. 491,694, dated February 14, 1893.

Application filed July 6, 1891. Serial No. 398,524. (No model.)

*To all whom it may concern:*

Be it known that I, PETER WHITE, a citizen of the United States, residing at St. Louis, in the State of Missouri, have invented a certain new and useful Automatic Supply-Valve for Tanks, of which the following is such a full, clear, and exact description as will enable any one skilled in the art to which it appertains to make and use the same, reference being had to the accompanying drawings, forming part of this specification.

The object of my invention is to construct a simple and reliable automatic supply-valve, more particularly for overhead tanks, which are used with water-closets—one which requires but little force to operate it.

Figure 1 is a sectional end elevation on a reduced scale, of a tank provided with a supply-valve made in accordance with my invention. Fig. 2 is a sectional elevation of the valve, illustrating the parts thereof in their normal positions, the valve being closed. Fig. 3 is a similar view wholly in section, showing the parts in a second position, the valve being open. Fig. 4 is an elevation partly in section of a modified way of applying the valve.

In the said drawings, in which the same marks of reference indicate the same parts, 5 is a tank and 6 a supply-pipe leading thereto and connected to the service-pipe. Within this pipe 6, and near the top thereof, is a thimble or cylinder 7 having any number of holes 8 through it, and provided at its upper end with a flange 9. The thimble 7 is of less diameter than the pipe 6, an annular space being left between the two. The flange 9 of the thimble or cylinder rests in a reamed-out place in the upper end of the pipe 6, and upon the flange and the top of the tube 6 is an elastic packing-ring 10, over which is placed a screw-cap 11 having a hole in the center of the top thereof, the under edges surrounding said hole being chamfered or turned off to make the hole slightly conical. The one elastic ring 10, it will be observed, serves to make a tight joint between the screw-cap 11, the pipe 6 and the thimble 7, as well as a tight joint with the piston 13. Through the hole in the top of the screw-cap 11 passes a stem 12 carrying two pistons 13 and 14, which work in the thimble or cylinder, the top side of the piston 13 being made conical to fit the conical bearing formed in the screw-cap 11. The piston 13 fits the cylinder rather loosely, but the piston 14 snugly, the latter being furnished with a suitable packing. The stem 12 carries a pin 15, which is engaged at each end by slots in a lever 16, bifurcated thereat and pivoted at 17 to an arm 18 extending from an offset 19 of the pipe 6. The stem 12 also carries a hood or deflector 20, the main purpose of which is to assist in closing the valve, as hereinafter set forth. The hood also incidentally deflects the rising stream of water downward and prevents it from spurting above the tank when the valve is opened to supply water to the tank. The free end of the lever 16 is provided with preferably, a globular float 21, which rises and falls with the level of the water in the tank, so as to open or close automatically the valve. By permitting the water as it issues from the valve, to strike against the hood, the float is assisted in closing the valve. By this means a smaller float can be used, and also a shorter lever arm for the float. This feature is particularly important, when it is remembered that in a great many places it is necessary to place the tank near the ceiling, or in a place where there is not sufficient room for a large tank. By using a hood as described herein, I am able to employ a very small float and short lever arm for opening and closing the supply-valve, and thus I am able to make a smaller tank, and to place it in positions in which ordinary tanks with the usual supply-valve, cannot be placed. Normally the float is maintained by the level of the water in the tank in its highest position so as to close the valve, putting the conical top of the piston 13 against the conical bearing formed by the screw-cap 11 and packing-ring 10, thereby closing the valve thereat and preventing the water from entering the tank. The pressure of the water in the service-pipe is exerted upon the under side of the piston 13, and on the top of the piston 14, which, being of substantially equal area, balance so that the slightest force will operate the valve, making it responsive and sensitive in an eminent degree. Were the pressure exerted upon the lower side of the piston 13 only, considerable power would be required to open the valve, and the float would have to be made very bulky in order to exert such power. When the level of the water in the tank falls, the weight of the float depresses the lever 16, opens the valve, and the water thereupon passes around the thimble 7, through the holes 8 therein and above the piston 13, which is now below the holes 8, going through the space between the stem 12 of the valve and its casing, striking the hood 20, which deflects it down in the tank (see Fig. 3). When the level in the tank rises, the float lifts the stem and pistons and closes the valve automatically shutting off the water. The upward stream of water entering the tank and striking the hood tends to assist the float in raising the valve to shut off the water, thereby making the valve close easily as well as open easily, as pointed out above. The stem is made hollow, a channel running through its entire length so as to leave the upper end thereof open, and the lower part of the cylinder or thimble communicating with the exterior air, thereby preventing a vacuum forming below the piston 14 when raised and also allowing any water that may be imprisoned below the said piston 14 from interfering with the operation of the valve, it passing up into the hollow stem when the piston 14 is depressed.

As has been observed, the piston 14 acts to make the valve open easily, the downward pressure of the water against said piston substantially counterbalancing the upward pressure of the water against the under surface of the valve, which pressure on the under surface of the valve 13 tends to hold the same to its seat. But the moment the valve 13 opens, the pressure of the water is equal on both sides of it. Consequently the downward pressure of the water on the piston 14 now tends to move the valve away from its seat. But on the other hand, the moment the valve opens, the force of the water impinging against the hood 20 tends to drive the valve in the reverse direction, counteracting the tendency of the piston 14. Should the valve yield to this action of the hood and move toward its seat, this of itself would diminish the flow of water through the valve and against the hood, thereby diminishing the force tending to close the valve, so that the valve would again become perfectly balanced. It will thus be seen that while the hood 20 and piston 14 have each a distinct function as heretofore explained, yet these parts co-operate in a marked manner in balancing the valve so as to make it yield readily to the action of the float.

The holes 8 in the thimble or cylinder in which the valve works may be made as small as desired, and as many as needed. The thimble may indeed, and does serve as a strainer for the water to prevent lead chippings in the pipes from entering the working parts of the valve and deranging it.

In Fig. 4, the thimble and parts of the valve are shown as applied to the bottom of the tank, and the pipe 6 rises but slightly above the bottom of the tank.

Having fully set forth my valve, what I desire to claim and secure by Letters Patent of the United States, as my invention, is:

1. The combination of a balanced supply-valve, a float governing the same, a hood against which the water impinges when emerging from the valve, and suitable connection between said hood and the valve.

2. The combination of a balanced supply-valve, a float and lever governing the supply-valve, a hood carried by said lever between the fulcrum and the float, and against which the fluid emitted by the supply-valve impinges.

3. In an automatic supply-valve, a float governing the same, a valve, a piston connected to the said valve and working in a suitable chamber, one end of which chamber is normally in communication with the supply-pipe while the other end thereof is in communication with the external air, and a hood also suitably connected to the valve and against which the water impinges when emerging from the valve.

4. An automatic supply-valve for a tank, comprising a suitably perforated thimble or cylinder arranged in the supply-pipe, a hollow open-ended stem carrying two pistons working in said cylinder, the upper piston loosely fitting and the lower one snugly fitting said cylinder, the perforated part of the cylinder being normally between said pistons, a seat against which the upper piston comes, a float controlling said stem, and a hood carried by said stem for the purpose set forth.

In testimony whereof I have hereunto set my hand and affixed my seal, this 3d day of July, 1891, in the presence of two subscribing witnesses.

PETER WHITE. [L. S.]

Witnesses:
 A. C. FOWLER,
 CHAS. H. ANDERSON.